United States Patent [19]

Higashi et al.

[11] Patent Number: 4,845,762

[45] Date of Patent: Jul. 4, 1989

[54] FREQUENCY PROCESSING METHOD AND APPARATUS FOR RADIATION IMAGE

[75] Inventors: Nobuaki Higashi; Nobuyoshi Nakajima; Hirosi Tanaka, all of Kanagawa, Japan

[73] Assignee: Fuji Photo Film Co., Ltd., Kanagawa, Japan

[21] Appl. No.: 214,794

[22] Filed: Jul. 5, 1988

Related U.S. Application Data

[63] Continuation of Ser. No. 708,462, Mar. 5, 1985, abandoned.

[30] Foreign Application Priority Data

Mar. 7, 1984 [JP] Japan .............................. 59-43528

[51] Int. Cl.[4] .............................................. G06K 9/00

[52] U.S. Cl. ...................................... 382/6; 358/111; 364/413.23; 250/327.2; 382/54

[58] Field of Search .................. 364/413.23; 358/111; 250/327.2 R, 327.2 A-327.2 G; 382/6, 54

[56] References Cited

U.S. PATENT DOCUMENTS

| | | | |
|---|---|---|---|
| 4,315,318 | 2/1982 | Kato et al. | 382/54 |
| 4,346,409 | 8/1982 | Ishida et al. | 364/414 |
| 4,527,061 | 7/1985 | Horikawa et al. | 250/484.1 |
| 4,611,247 | 9/1986 | Ishida et al. | 250/327.2 |

FOREIGN PATENT DOCUMENTS

| | | | |
|---|---|---|---|
| 0094843 | 11/1983 | Japan | 250/327.2 |

*Primary Examiner*—Leo H. Boudreau
*Assistant Examiner*—Jose L. Couso
*Attorney, Agent, or Firm*—Sughrue, Mion, Zinn, Macpeak & Seas

[57] ABSTRACT

In a radiation image recording and reproducing system, an image signal obtained by forming a radiation image by a radiation passing through an object and photoelectrically detecting the radiation image is subjected to frequency processing by use of a predetermined degree of enhancement. The degree of enhancement is corrected in accordance with the radiation exposure dose so that the degree of enhancement is decreased as the exposure dose decreases, thereby improving the image quality of a reproduced visible image.

8 Claims, 2 Drawing Sheets

FREQUENCY PROCESSING METHOD AND APPARATUS FOR RADIATION IMAGE

This is a Continuation of application Ser. No. 708,462, filed Mar. 5, 1985, now abandoned.

BACKGROUND OF THE INVENTION

1. Field of the Invention

This invention relates to a frequency processing method for a radiation image for viewing, particularly for diagnostic purposes, and an apparatus for carrying out the method. This invention particularly relates to a method of reducing noise in a frequency processing for improving the image quality, particularly diagnostic efficiency and accuracy, of a radiation image, and an apparatus for carrying out the method.

By the term "frequency processing" as used herein is meant a processing for enhancement of frequency response, for example, an unsharp mask processing as disclosed in U.S. Pat. No. 4,315,318 and Japanese Unexamined Patent Publication No. 55(1980)-87953.

2. Description of the Prior Art

The frequency processing as described above is conducted for improving the image quality, particularly diagnostic efficiency and accuracy, of a radiation image. However, in the frequency processing, a problem arises as described below. That is, in radiation image information obtained by exposure to a radiation of low dose, radiation quantum noise becomes perceptible. When the radiation image information is directly subjected to the processing for enhancement of frequency response, a rough image wherein noise is enhanced is obtained and the image quality, particularly diagnostic efficiency and accuracy, is adversely affected by noise.

The degree of enhancement in the frequency processing is adjusted by an external input, for example manually, in accordance with the image recording portion of an object, the image recording method (contrasted image recording, tomography, etc.) or the like. In this case, it is impossible to cope with the effect of noise changing with the level of radiation exposure dose.

SUMMARY OF THE INVENTION

The primary object of the present invention is to provide a frequency processing method for a radiation image wherein a frequency processing is conducted so that noise is not perceptible when the radiation exposure dose is low.

Another object of the present invention is to provide a frequency processing method for a radiation image, which realizes an image having an improved image quality, particularly a high diagnostic efficiency and accuracy.

The specific object of the present invention is to provide an apparatus for carrying out the frequency processing method.

The frequency processing method for a radiation image in accordance with the present invention is characterized by correcting the degree of enhancement in the frequency processing for a radiation image so that the degree of enhancement is low when the radiation exposure dose at the time of recording an image of an object is low.

Namely, when the exposure dose is low and quantum noise becomes perceptible, the degree of enhancement in the frequency processing is decreased to prevent the image quality, particularly diagnostic efficiency and accuracy, from becoming low.

By "decreasing the degree of enhancement when the exposure dose is low" is meant that correction is conducted to decrease the degree of enhancement when the exposure dose is relatively low. Therefore, when the exposure dose becomes relatively high, the degree of enhancement is increased. When the exposure dose is high, since radiation quantum noise becomes imperceptible, the degree of enhancement of frequence response may be high. In this case, from the viewpoint of improvement in the image quality, particularly diagnostic efficiency and accuracy, the degree of enhancement of frequency response should preferably be as high as possible.

In order to detect the exposure dose, it is possible to use a method wherein the exposure dose is calculated from the information on the tube voltage and tube current of the radiation source, exposure time, distance from the focal point to the detector, or the like, at the time of image recording, or a method wherein the exposure dose is directly measured. Also, when a recorded radiation image is read out and converted into an electric image signal which is subjected to the frequency processing, the exposure dose may be detected by detecting the level of the electric image signal.

The frequency processing method of the present invention is applicable to any system wherein a radiation image is converted into an electric signal which is subjected to image processing. However, the method of the present invention exhibits high effects particularly in a radiation image recording and reproducing system as disclosed, for example, in U.S. Pat. No. 4,258,264, wherein a stimulable phosphor sheet which can form a radiation image having an improved image quality, particularly a high diagnostic efficiency and accuracy, with a low exposure dose is used. That is because the method of the present invention realizes visual reduction in quantum noise which increases particularly in the case of low exposure dose.

A novel method of conducting image read-out in two stages in the radiation image recording and reproducing system using a stimulable phosphor sheet is proposed, for example, in Japanese Unexamined Patent Publication Nos. 58(1983)-67240, 58(1983)-67243 and 58(1983)-67244. The method comprises the steps of conducting read-out (hereinafter referred to as the preliminary read-out) for approximately detecting the image information by scanning the stimulable phosphor sheet carrying a radiation image stored therein by stimulating rays of a relatively low level, and then carrying out read-out (hereinafter referred to as the final read-out) for detecting the image information in detail by use of stimulating rays of a level higher than the level of the stimulating rays used in the preliminary read-out on the basis of the information obtained by the preliminary read-out. In this case, the exposure dose can be detected easily from the information obtained by the preliminary read-out. Of course, it is also possible to detect the exposure dose from the information obtained by the final read-out and to correct the degree of enhancement in the frequency processing on the basis of the detected exposure dose.

In the present invention, since the degree of enhancement of frequency response is decreased when the exposure dose at the time of recording an image of an object is low and quantum noise becomes perceptible, noise enhancement is restricted and it is possible to obtain a visible radiation image having an improved image quality, particularly a high diagnostic efficiency and accuracy.

When the exposure dose is low and the noise level is low or when noise is reduced by superposing a plurality of images, it is possible to further improve the image quality, particularly the diagnostic efficiency and accuracy, by increasing the degree of enhancement in the frequency processing.

DESCRIPTION OF THE PREFERRED EMBODIMENTS

The present invention will hereinbelow be described in further detail with reference to the accompanying drawings. Particularly, embodiments of the present invention will be described with respect to the case where the frequency processing is applied to the radiation image recording and reproducing system wherein the preliminary read-out and the final read-out are conducted by use of a stimulable phosphor sheet.

Figure 1:
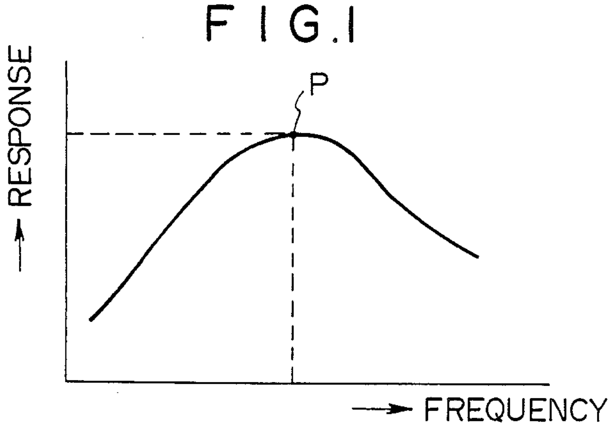
FIG. 1 is a graph showing the relationship between the frequency and the response in frequency processing.

FIG. 1 shows the relationship between the frequence and the response in the frequency processing. Frequency processing conditions are changed by changing the position of a peak P along the horizontal axis, i.e. the frequency (parameter f) at which the degree of enhancement is the maximum, and the height of the peak P, i.e. the degree of enhancement (parameter β). Basically, the parameter 8 is determined to an appropriate value in accordance with the image recording portion of an object, such as the chest or the abdomen, and the image recording method, such as contrasted image recording or tomography. In the present invention, the parameter β is further corrected in accordance with the exposure dose.

Figure 2A:
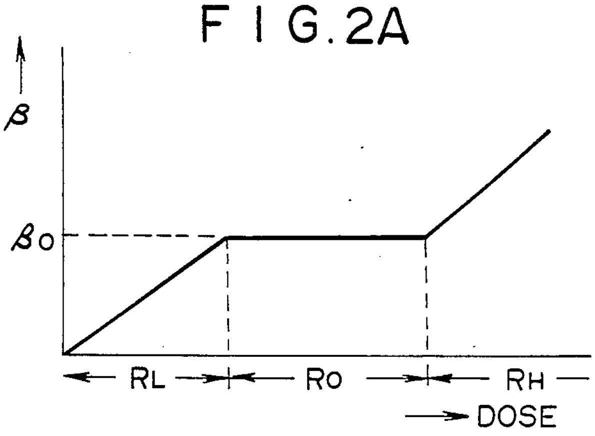
FIGS. 2A, 2B and 2C are graphs showing the relationship between the exposure dose and the degree of enhancement (β) in the frequency processing in accordance with the present invention.

FIG. 2A shows an example of a change in the parameter β in accordance with the exposure dose. When the exposure dose is within the normal range $R_O$, the parameter β for the degree of enhancement is adjusted to a predetermined value βo. When the exposure dose is within the range $R_L$ lower than the normal level, the parameter β for the degree of enhancement is decreased as the exposure dose becomes low. When the exposure dose is within the high range $R_H$, the parameter β is increased as the exposure dose becomes high. In this manner, it is possible to make noise imperceptible when the exposure dose is low and quantum noise in high, and to increase the degree of enhancement of frequency response when the exposure dose is high and quantum noise is low, thereby improving the image quality, particularly the diagnostic efficiency and accuracy.

Figure 2B:
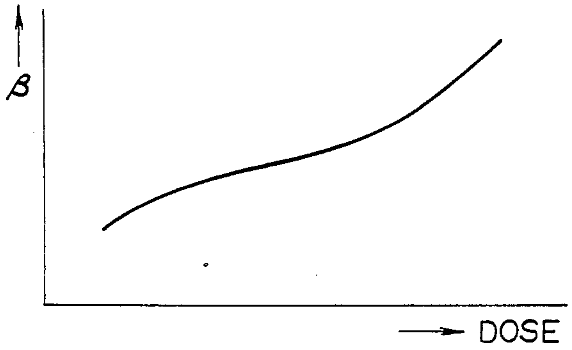
Figure 2C:
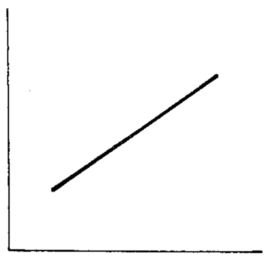

The change in the parameter β for frequency enhancement is not limited to the change as shown in FIG. 2A. Namely, it is sufficient that the parameter β be increased as the exposure dose increases (however, the parameter β need not be changed within a specific exposure dose range). For example, the parameter β may be gradually changed curvilinearly as shown in FIG. 2B, or may be changed along a straight line as shown in FIG. 2C. In FIGS. 2B and 2C, the parameter β is a monotonous increasing function of the exposure dose.

The parameter β corresponds to β in the unsharp mask processing formula $$S' = Sorg + \beta(Sorg - Sus)$$

where S′ denotes the frequency-processed signal, Sorg denotes the read-out output signal, Sus denotes the unsharp mask signal, and β denotes the degree of enhancement, as disclosed, for example, in U.S. Pat. No. 4,315,318.

Figure 3:
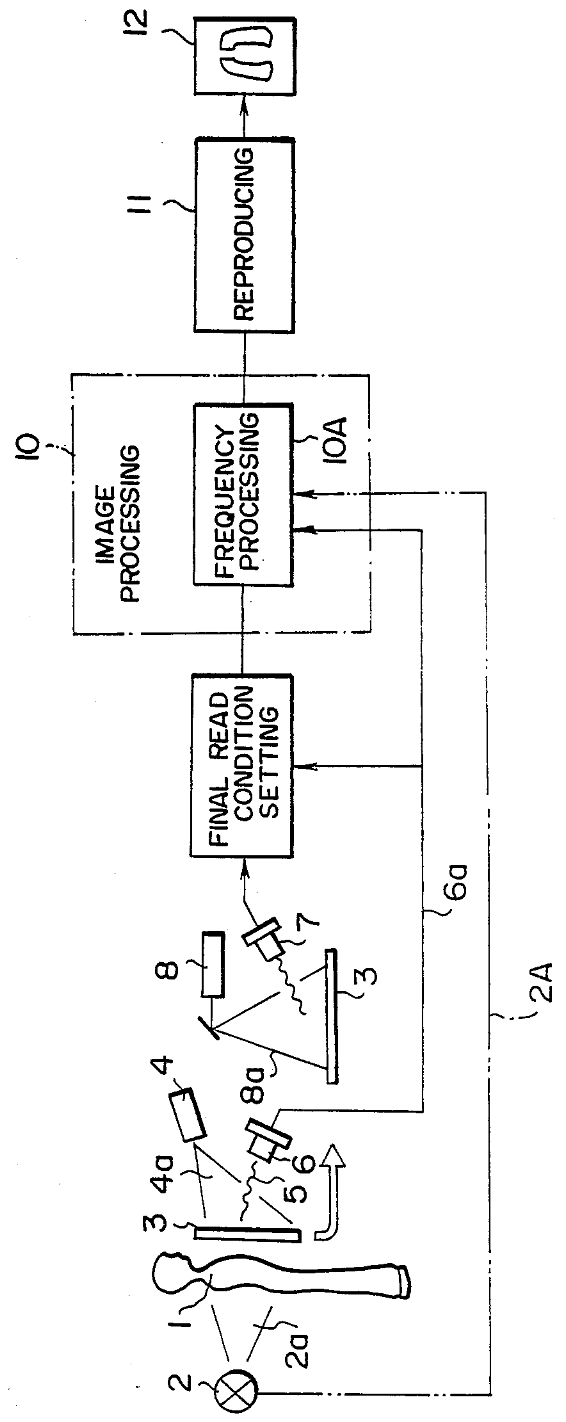
FIG. 3 is a schematic view showing the radiation image recording and reproducing system wherein an apparatus for carrying out the method of the present invention is employed.

FIG. 3 shows the configuration of an apparatus for carrying out correction of the parameter β in accordance with the exposure dose.

A stimulable phosphor sheet 3 is exposed to a radiation 2a emitted by a radiation source 2 such as an X-ray source and passing through an object 1 such as the human body to have a radiation image of the object 1 stored in the stimulable phosphor sheet 3. The stimulable phosphor sheet 3 carrying the radiation image stored therein is then exposed to stimulating rays 4a of a relatively low level (having energy of a level lower than the level of the energy of stimulating rays 8a used in final read-out as described later) emitted by a stimulating ray source 4 such as a laser beam source. Light 5 emitted by the stimulable phosphor sheet 3 when it is exposed to (scanned by) the stimulating rays 4a is detected by a photoelectric read-out means 6 (preliminary read-out). On the basis of the approximate image information obtained by the output 6a of the preliminary read-out, read-out conditions such as the read-out gain and the scale factor in a photoelectric read-out means 7 for the final read-out are adjusted. The final read-out is conducted by scanning the stimulable phosphor sheet 3 by the stimulating rays 8a which are of a level higher than the level of the stimulating rays 4a used in the preliminary read-out and which are emitted by a stimulating ray source 8 for the final read-out.

The image information output by the photoelectric read-out means 7 for the final read-out is sent to an image processing section 10 and subjected to image processings such as frequency processing and gradation processing for improving the image quality, particularly the diagnostic efficiency and accuracy, of an image 12 reproduced by an image reproducing apparatus 11.

The output 6a of the photoelectric read-out means 6 for the preliminary read-out is sent also to a frequency processing section 10A of the image processing section 10, and the parameter β is adjusted in accordance with the exposure dose as shown in FIGS. 2A, 2B and 2C. That is, since the output 6a of the photoelectric read-out means 6 represents the level of the radiation energy stored in the stimulable phosphor sheet 3 and the level corresponds to the radiation exposure dose, the output 6a represents a value on the horizontal axis in FIGS. 2A, 2B and 2C. The degree of enhancement (parameter β) in the frequency processing can be adjusted on the basis of the output 6a when tables corresponding to the graphs as shown in FIGS. 2A, 2B and 2C are stored in the frequency processing section 10A.

The information on the exposure dose may also be obtained without using the preliminary read-out output 6a. For example, the information on the exposure dose may be directly sent from the radiation source 2 to the frequency processing section 10A as indicated by the chain line 2A. For this purpose, a drive control panel for the radiation source 2 may also be used.

As described above, the level of the stimulating rays used in the preliminary read-out should be lower than the level of the stimulating rays used in the final read-out. That is, the effective energy of the stimulating rays which the stimulable phosphor sheet receives per unit area in the preliminary read-out should be lower than the effective energy of the stimulating rays used in the final read-out. In order to make the level of the stimulating rays used in the preliminary read-out lower than the level of the stimulating rays in the final read-out. Alternatively, a stimulating ray source for the preliminary read-out may be positioned independently of the stimulating ray source for the final read-out as in the above-described embodiment, and the output of the former may be made lower than the output of the latter. The output of a single stimulating ray source such as a laser beam source may be decreased in the preliminary read-out, or the stimulating rays emitted by the stimulating ray source may be attenuated by a ND (neutral density) filter, an AOM (acousto-optic modulation), or the like positioned on the optical path. Or, the beam diameter of the stimulating-rays may be increased, the scanning speed of the stimulating rays may be increased, or the moving speed of the stimulable phosphor sheet may be increased in the preliminary read-out.

Details on the preliminary read-out, for example the relationship between the preliminary read-out and the final read-out, are described, for example, in Japanese Unexamined Patent Publication Nos. 58(1983)-67240, 58(1983)-67243 and 58(1983)-67244.

We claim:

1. A frequency processing method for a radiation image formed by passing an exposure dose of radiation through an object and photoelectrically detecting the radiation image to form an image signal, comprising the steps of:

frequency processing said image signal using a predetermined degree of frequency enhancement, detecting the exposure dose of said radiation, and correcting the degree of frequency enhancement in said frequency processing in response to said detected exposure dose so that said degree of frequency enhancement is decreased in response to detection of a decrease in the exposure dose of the radiation.

2. A method as defined in claim 1 wherein the formation of said radiation image is conducted by having said radiation passing through the object stored in a stimulable phosphor sheet, and said photoelectric detection is conducted by photoelectrically detecting light emitted by said stimulable phosphor sheet carrying said radiation image stored therein when said stimulable phosphor sheet is exposed to stimulating rays.

3. A method as defined in claim 2 wherein said photoelectric detection of said radiation image is conducted by two read-out stages consisting of final read-out for obtaining said image signal by scanning said stimulable phosphor sheet with stimulating rays, and preliminary read-out for approximately detecting said radiation image stored in said stimulable phosphor sheet by scanning said stimulable phosphor sheet with stimulating rays of a level lower than the level of the stimulating rays used in the final read-out before the final read-out is conducted, and read-out conditions for the final read-out are adjusted on the basis of the read-out information obtained by the preliminary read-out.

4. A method as defined in claim 3 wherein the exposure dose of said radiation is detected from the information obtained by the preliminary read-out.

5. A method as defined in claim 1 wherein the exposure dose of said radiation is detected from the information obtained by said photoelectric detection.

6. A method as defined in claim 1 wherein the exposure dose of said radiation is measured when the object is exposed to said radiation.

7. A frequency processing apparatus for a radiation image, which comprises:

(i) a radiation image formation means for forming the radiation image by a radiation passing through an object, (ii) a read-out means for photoelectrically detecting said radiation image and obtaining an image signal, (iii) a frequency processing means for conducting frequency processing of said image signal obtained by said read-out means by use of a predetermined degree of frequency enhancement, (iv) an enhancement degree correction means for correcting said degree of enhancement in said frequency processing in accordance with the level of a detected exposure dose of said radiation so that said degree of frequency enhancement is decreased as the exposure dose decreases, and (v) an exposure dose detecting means for detecting the exposure dose of said radiation and sending the detected exposure dose to said correction means.

8. An apparatus as defined in claim 7 wherein said exposure dose detecting means detects the exposure dose of said radiation from the output of said read-out means.

* * * * *